(No Model.)
D. G. McCLAY.
FRUIT GATHERER.
No. 464,380.          Patented Dec. 1, 1891.
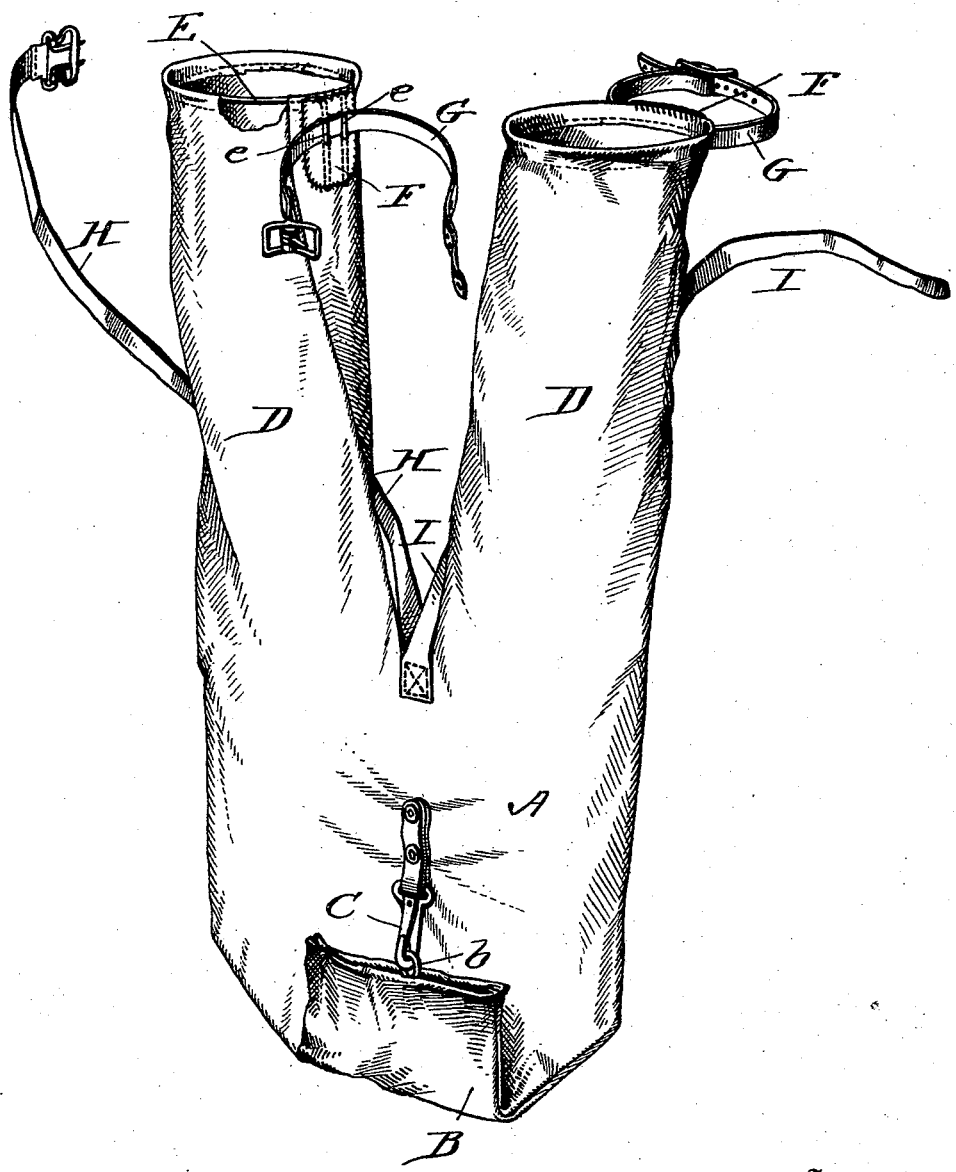
Witnesses
Inventor,
David G. McClay,
By his Attorneys

UNITED STATES PATENT OFFICE.

DAVID GREEN McCLAY, OF SANTA ANA, CALIFORNIA.

FRUIT-GATHERER.

SPECIFICATION forming part of Letters Patent No. 464,380, dated December 1, 1891.

Application filed June 15, 1891. Serial No. 396,339. (No model.)

*To all whom it may concern:*

Be it known that I, DAVID GREEN MCCLAY, a citizen of the United States, residing at Santa Ana, in the county of Orange and State of California, have invented certain new and useful Improvements in Fruit-Gathering Sacks; and I do hereby declare the following to be a full, clear, and exact description of the invention, such as will enable others skilled in the art to which it appertains to make and use the same.

This invention relates to sacks for fruit.

The object of the invention is to facilitate the gathering of fruit and prevent injury to the same while being gathered.

The improvement consists of a sack having a discharge-spout at its lower end and two receiving-tubes at its upper end.

The improvement also consists in distending wires or bands at the mouth of the said receiving-tubes and wrist-straps for securing the ends of the tubes to the wrist of the operator.

The improvement further consists of the novel features and the peculiar construction and combination of the parts, which will be hereinafter more fully described and claimed, and which are shown in the accompanying drawing, which is a perspective view, parts being broken away, of a fruit-gathering sack embodying my invention.

The sack A is provided at its lower end with the discharge-spout B, which, when the fruit is to be retained, is folded and held closed by suitable fastening means, as the snap-hook C and the ring b, and at its upper end with the receiving-tubes D D. The sack is made from stout textile fabric, such as duck, and is constructed with a minimum number of seams, the sack and the receiving-tubes having but a single seam each. The mouth of the receiving-tubes is held distended by a wire or band E and is provided on one side with the braces e, which are designed to bear against the wrist of the operator and hold the wire or band E in an approximately horizontal position, whereby the fruit may be dropped into the said tubes. The braces e in the present case are formed by bending the ends of the wire E at about right angles to the plane of the mouth of the said tube. The re-enforce F, of leather or similar tough material, protects the ends of the braces e and forms a pad to prevent the chafing of the wrist. The wrist-straps G are adapted to be buckled around the wrists and hold the free ends of the receiving-tubes in proper position to receive the fruit as it is dropped from the hand, and are secured to the receiving-tubes in any desired manner, preferably by being slipped or passed between a portion of the said braces e and the said receiving-tubes. The straps H and I are intended to be passed over the shoulders and buckled in front of the operator and support the sack and its load and relieve the wrists of any of the burden, except the slight weight of the receiving-tubes.

The sack being secured to the operator, both hands being free, he picks the fruit with each hand and drops it into the tubes, which guide the fruit into the main portion of the sack. When the sack is sufficiently filled, the discharge-spout is released and the fruit delivered into a box or other receptacle placed to receive it.

Having thus described my invention, what I claim, and desire to secure by Letters Patent, is—

1. A fruit-gathering sack having its sides converging at the lower end and terminating in a single opening and having a discharge-spout projected from the said single opening and constructed to fold on the sack, two receiving-tubes integral with and projected from the upper end of the said sack, shoulder-straps connected with the sack at the point of convergence of the said receiving-tubes, straps for attaching the tubes to the wrist, distending-wires, and braces projected from the said distending-wires and adapted to bear laterally on the wrists and hold the said distending-wires in an approximately horizontal position, substantially as and for the purpose described.

2. The combination, with a fruit-gathering sack having a receiving-tube, of a wire or band to distend the mouth of the said tube, braces extended from the said wire or band and adapted to bear laterally on the wrist, and a wrist-strap, substantially as set forth.

3. The combination, with a fruit-gathering sack having a receiving-tube, of a wire secured to the open end of the said tube and having its ends extended to form braces, which are adapted to bear laterally on the wrist, a re-enforce secured to the tube over the said braces, and a wrist-strap passed between the tube and the braces, substantially as and for the purpose described.

4. A fruit-gathering sack having a folding discharge-spout at its lower end and having two receiving-tubes at its upper end, a ring and snap-hook to hold the said spout in the folded condition, wires for distending the open ends of the receiving-tubes, braces projected from the said wires and adapted to bear against the wrists to hold the said wires in an approximately horizontal plane when the device is in efficient service, wrist-straps for securing the tubes to the wrist, and shoulder-straps secured to the sack at the lower ends of the said tubes, substantially as shown.

In testimony whereof I affix my signature in presence of two witnesses.

DAVID GREEN McCLAY.

Witnesses:
F. A. SMITH,
A. JOHNSTON.